(12) United States Patent
Song et al.

(10) Patent No.: US 12,555,710 B2
(45) Date of Patent: Feb. 17, 2026

(54) FUSION REACTOR SUPERCONDUCTING MAGNET SYSTEM

(71) Applicant: HEFEI INSTITUTES OF PHYSICAL SCIENCE, CHINESE ACADEMY OF SCIENCES, Hefei (CN)

(72) Inventors: Yuntao Song, Hefei (CN); Jinggang Qin, Hefei (CN); Kun Lu, Hefei (CN); Guang Shen, Hefei (CN); Jing Wei, Hefei (CN); Yanlan Hu, Hefei (CN); Liansheng Huang, Hefei (CN); Chao Dai, Hefei (CN); Zhigang Zhu, Hefei (CN); Huajun Liu, Hefei (CN)

(73) Assignee: HEFEI INSTITUTES OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 171 days.

(21) Appl. No.: 18/657,769

(22) Filed: May 7, 2024

(65) Prior Publication Data

US 2026/0031261 A1    Jan. 29, 2026

(30) Foreign Application Priority Data

Aug. 9, 2023   (CN) .......................... 202310996242.X

(51) Int. Cl.
*H01F 6/02*         (2006.01)
*G21B 1/11*         (2006.01)
(Continued)

(52) U.S. Cl.
CPC ................. *H01F 6/02* (2013.01); *G21B 1/11* (2013.01); *G01D 21/02* (2013.01); *G01H 9/004* (2013.01);
(Continued)

(58) Field of Classification Search
CPC ..... H01F 6/02; H01F 6/04; H01F 6/00; H01F 6/06; G21B 1/11; G21B 1/05; G21B 1/21;
(Continued)

(56) References Cited

U.S. PATENT DOCUMENTS

| | | | |
|---|---|---|---|
| 2017/0179364 A1* | 6/2017 | Schwartz | G21B 1/21 |
| 2019/0252104 A1* | 8/2019 | Slade | H01F 6/02 |
| 2024/0337541 A1* | 10/2024 | Salazar | G01K 11/3206 |

FOREIGN PATENT DOCUMENTS

| | | |
|---|---|---|
| CN | 202650758 U | 1/2013 |
| CN | 106602908 A | 4/2017 |

(Continued)

OTHER PUBLICATIONS

Scurti, "Quench detection for high temperature superconductor magnets: A novel technique based on Rayleigh-backscattering interrogated optical fibers", Superconductor Science and Technology, vol. 29 No. 3 (2016): 03LT01. (Year: 2016).*

(Continued)

*Primary Examiner* — Jack W Keith
*Assistant Examiner* — Daniel Wasil

(57) ABSTRACT

A superconducting magnet system for fusion reactor includes a superconducting magnet unit, an integrated power supply system and a quench diagnostic system. The superconducting magnet unit includes a superconducting coil module and a cryogenic refrigeration module. The superconducting coil module includes a toroidal field coil, a poloidal field coil and a centric solenoidal magnet module. The integrated power supply system includes a power supply module, a power supply monitoring module, and an alternating current (AC)/direct current (DC) power distribution module connected to the power supply module and the power supply monitoring module. The quench diagnostic (Continued)

system includes a resistive voltage diagnostic module, a distributed optical fiber diagnostic module and a voiceprint diagnostic module.

6 Claims, 3 Drawing Sheets

(51) Int. Cl.
| | |
|---|---|
| G01D 21/02 | (2006.01) |
| G01H 9/00 | (2006.01) |
| G10L 25/24 | (2013.01) |
| G10L 25/51 | (2013.01) |
| G21B 1/05 | (2006.01) |
| G21B 1/21 | (2006.01) |
| H01F 6/00 | (2006.01) |
| H01F 6/04 | (2006.01) |
| H01F 6/06 | (2006.01) |

(52) U.S. Cl.
CPC .............. *G10L 25/24* (2013.01); *G10L 25/51* (2013.01); *G21B 1/05* (2013.01); *G21B 1/21* (2013.01); *H01F 6/00* (2013.01); *H01F 6/04* (2013.01); *H01F 6/06* (2013.01)

(58) Field of Classification Search
CPC ........ G01D 21/02; G01H 9/004; G10L 25/24; G10L 25/51
USPC .................................................. 376/133, 142
See application file for complete search history.

(56) References Cited

FOREIGN PATENT DOCUMENTS

| | | | | |
|---|---|---|---|---|
| CN | 110261799 A | 9/2019 | | |
| CN | 210075085 U | 2/2020 | | |
| CN | 210957901 U | 7/2020 | | |
| CN | 111665462 A | 9/2020 | | |
| CN | 113724959 A | 11/2021 | | |
| CN | 114487952 A | 5/2022 | | |
| CN | 116072372 A | 5/2023 | | |
| CN | 116430284 A | * 7/2023 | ......... G01R 33/1238 |
| JP | 2012182265 A | * 9/2012 | ............... H01F 6/06 |

OTHER PUBLICATIONS

Chan, "Spatial and temporal resolution requirements for quench detection in (RE) Ba2Cu3Ox magnets using Rayleigh-scattering-based fiber optic distributed sensing", Superconductor Science and Technology, vol. 26 No. 10 (2013): 105015. (Year: 2013).*

Peng Fu, "Introduction of Power Supply System for International Fusion Reactor ITER", Power Electronics, vol. 48, No. 12, Dec. 20, 2014, pp. 1-7.

* cited by examiner

```
                                                              201
┌─────────────────────────────────────────────────┐
│ Transmitting an optical signal to the distributed│
│ optical fiber preset in the superconducting      │
│ magnet unit to obtain Rayleigh-scattered light   │
│ reflected from different regions of the distributed│
│ optical fiber                                    │
└─────────────────────────────────────────────────┘
                        │
                        ▼                     202
┌─────────────────────────────────────────────────┐
│ Processing the Rayleigh-scattered light through a│
│ preset acoustic-optical modulation method to     │
│ obtain a voiceprint signal corresponding to the  │
│ Rayleigh-scattered light                         │
└─────────────────────────────────────────────────┘
                        │
                        ▼                     203
┌─────────────────────────────────────────────────┐
│ Identifying the voiceprint signal using a        │
│ predetermined vector quantization algorithm to   │
│ determine whether the superconducting magnet     │
│ suffers a quench                                 │
└─────────────────────────────────────────────────┘
                        │
                        ▼                     204
┌─────────────────────────────────────────────────┐
│ If the superconducting magnet suffers a quench,  │
│ obtaining temperatures and spectral shifts of    │
│ different regions of the distributed optical fiber│
│ through a predetermined spectral analysis        │
│ method based on the Rayleigh-scattered light     │
│ reflected from the different regions of the      │
│ distributed optical fiber                        │
└─────────────────────────────────────────────────┘
                        │
                        ▼                     205
┌─────────────────────────────────────────────────┐
│ Comparing the temperature and spectral shift     │
│ respectively with a predetermined temperature    │
│ threshold and a spectral shift threshold to obtain│
│ a quench region of the superconducting magnet    │
│ unit                                             │
└─────────────────────────────────────────────────┘
```

Fig. 2

FUSION REACTOR SUPERCONDUCTING MAGNET SYSTEM

CROSS-REFERENCE TO RELATED APPLICATIONS

This application claims the benefit of priority from Chinese Patent Application No. 202310996242.X, filed on Aug. 9, 2023. The content of the aforementioned application, including any intervening amendments thereto, is incorporated herein by reference in its entirety.

TECHNICAL FIELD

This application relates to magnet technology, and more specifically to a superconducting magnet system for a fusion reactor.

BACKGROUND

At present, coil windings of the superconducting magnet for fusion reactors are all made of low-temperature superconducting materials, such as NbTi and $Nb_3Sn$, which have low upper critical magnetic fields (about 14 Tesla for NbTi, and about 30 Tesla for $Nb_3Sn$). Moreover, the practical magnetic field strengths of NbTi and $Nb_3Sn$ are about 6 Tesla and 12-16 Tesla, respectively, which greatly limits the magnetic field strengths of the fusion reactor magnet. Moreover, most of structural materials of the superconducting magnet system for the fusion reactor are 316 L/LN, which has a yield strength of about 900 MPa at a low temperature, and a required yield strength of about 600 MPa. Since improving operating parameters of the magnet system will be accompanied by a huge electromagnetic load, which is basically borne by the structural materials, the strength of the current structural materials restricts the enhancement of the operating parameters of the magnet system.

Currently, the coil windings of the superconducting magnet for fusion reactors all adopt a single-stage winding structure, that is, all windings are made of the same superconducting material. However, as the requirements for the magnetic field of the magnet system for fusion reactors become higher and higher (for example, the maximum magnetic field strength of the CFETR TF coil reaches 15 Tesla, and the maximum magnetic field strength of the CS coil exceeds 20 Tesla), the use of the existing single-stage winding structure will excessively increase the coil size, thereby increasing the consumption of superconducting materials and structural materials and the magnet cost.

The existing Tokamak superconducting magnet power supply adopts a three-phase thyristor bridge power supply structure, which is designed with a single bridge or dual-bridge parallel mode according to the rated operating current of the magnet. According to the polarity requirements of the output current of the magnet power supply, there are a single-polarity two-quadrant power supply and a bipolar four-quadrant power supply, which often adopt a 6-pulse or 12-pulse power supply mode, and have a large output voltage and current ripple. Moreover, the power supply is formed merely by elements connected in parallel, leading to a low redundancy. In this case, the failure of any of the rectifier bridges will lead to the failure of the magnet power supply. In the meanwhile, the quench detection is performed using a single resistive voltage-based detection method, which struggles with difficult signal detection, and is susceptible to electromagnetic interference (especially in the electromagnetic environment with strong coupling of multiple coils, there are coupled background noises of the kilovolt level). At the same time, the quench propagation of the high-temperature superconducting material is slow (microvolt level) during the initial stage, and it requires a long time for quench development to reach the quench voltage detection threshold (basically irreversible quench). Moreover, in the resistive voltage diagnosis, it is required directly weld the potential measuring wire to the conductor, and the high voltage is directly led out of the device, which is adverse to the insulation of the magnet and the device, and makes the repair very difficult. Due to the low quench propagation at the early quench stage of the high-temperature superconducting magnet, it is difficult to identify the early reversible quench through the voltage-based diagnosis approach, and thus cannot perform the quench warning. For the large high-temperature magnet, the potential monitoring covers a wide range, and it is not possible to achieve the accurate positioning for the quench, and thus not conducive to the later analysis of the causes of the quench.

SUMMARY

An objective of the present disclosure is to provide a superconducting magnet system for a fusion reactor to solve the above technical problems in the prior art. Technical solutions of the present disclosure are described below.

This application provides a superconducting magnet system for a fusion reactor, comprising:
 a superconducting magnet unit;
 an integrated power supply system; and
 a quench diagnostic system;
 wherein the superconducting magnet unit comprises a superconducting coil module and a cryogenic refrigeration module; the superconducting coil module comprises a toroidal field coil, a poloidal field coil and a centric solenoidal magnet module;
 the integrated power supply system comprises a power supply module, a power supply monitoring module, and an alternating current (AC)/direct current (DC) power distribution module connected to the power supply module and the power supply monitoring module; the power supply monitoring module is connected to the quench diagnostic system; the AC/DC power distribution module comprises a DC power supply unit and an AC power supply unit; and
 the quench diagnostic system comprises a resistive voltage diagnostic module, a distributed optical fiber diagnostic module and a voiceprint diagnostic module; the distributed optical fiber diagnostic module comprises a distributed sensing optical fiber, an optical fiber splitting unit, a signal processing unit and a quench detection unit; and the voiceprint diagnostic module comprises a optical signal processing unit, a voiceprint processing unit and a quench determination unit.

The present disclosure discloses a superconducting magnet system for a fusion reactor, comprising a superconducting magnet unit, an integrated power supply system and a quench diagnostic system. The superconducting magnet unit comprises a superconducting coil module comprises a toroidal field coil, a poloidal field coil and a centric solenoidal magnet module. The superconducting coil is configured to generate a toroidal magnetic field to confine the plasma and control the bit type of the plasma to facilitate breakdown of the plasma and to maintain a plasma current for energy formation. The integrated power supply system comprises a power supply module, a power supply monitoring module, and an AC/DC power distribution module. The AC/DC power distribution module comprises a DC power supply unit and an AC power supply unit, improving reliability of power supply. The quench diagnostic system comprises the traditional resistive voltage quench detection method, and monitor the superconducting magnet system voltage in real time, so as to realize the quench detection. This technology is mature, and once the quench appears, it can be detected quickly and reliably. At the same time, the distributed optical fiber diagnostic module and the voiceprint diagnostic module are provided for monitoring local hot spot events, which assists in detecting weak points of the high-temperature superconducting magnet, achieves the quench warning and assessment by combining with the monitoring data of the relevant thermal parameters, and improves the accuracy of the quench positioning when the quench occurs in the superconducting magnet.

In an embodiment, two superconducting materials, i.e., Bi2212 and ReBCO, and a structural material (N50) are used in the superconducting magnet system.

The present disclosure introduces two superconducting materials, i.e., Bi2212 and ReBCO, in the superconducting magnet system. The two superconducting materials maintain high current density even when the magnetic field strength is more than 20 Tesla, which are suitable for the use of fusion reactor magnets and can improve the magnetic field strength of the fusion reactor magnets. At the same time, the superconducting magnet system adopts the ultra-low temperature high-strength structural material N50, which is able to bear huge electromagnetic loads and improve the operating parameters of the magnet.

In an embodiment, the superconducting coil module is configured to adopt a graded hybrid winding, wherein windings or coils are configured to be graded according to a magnetic field distribution of a magnet winding, and the windings or coils in different grades are made of different superconducting materials.

The present disclosure adopts graded hybrid windings or hybrid magnets, wherein windings or coils are configured to be graded according to a magnetic field distribution of a magnet winding; and the windings or coils in different grades are made of different superconducting materials, reducing the size of the coil and the cost of the superconducting magnet system.

In an embodiment, the AC/DC power distribution module is formed by the DC power supply unit and the AC power supply unit connected in series, wherein an AC side of the AC/DC power distribution module is configured to adopt a multi-pulse AC phase shifting mode, and a DC side of the AC/DC power distribution module is provided with a pulse wave power supply.

In this application, a multi-pulse wave AC phase shifting mode is adopted on an AC side, and a 6*N pulse wave power supply is constructed on a DC side, which can reduce DC output voltage ripple and current ripple, improve power system redundancy and enhance power supply reliability.

In an embodiment, the DC power supply unit comprises four converter units, i.e., CU 1, CU2, CU3 and CU4. Each of the four CUs is configured to adopt a modularized design with an independent control system and a bypass switch, and the four CUs form four independent DC power supply modules.

The DC power supply unit in the present disclosure comprises four converter units, i.e., CU 1, CU2, CU3 and CU4. Each of the four CUs is configured to adopt a modularized design with an independent control system and a bypass switch, and the four CUs form four independent DC power supply modules, which work simultaneously without interfering with each other to improve current stability.

In an embodiment, the DC power supply module is configured to cut off a positive and negative isolation switch when detecting that a current of a loop drops to zero.

In the present disclosure, when the four power supply modules are working at the same time, once one of the modules fails, it is only necessary to withdraw the faulty module from operation, and when the current in the unit circuit of the faulty module drops to zero, the positive and negative isolation switches are cut off. In this case, the fault is completely removed from the system. In this way, the load current is used as the feedback for all modules, and when one module exits due to failures, the other three modules are still fed with the load current, thus ensuring the stability of the load current.

In an embodiment, the resistive voltage diagnostic module is configured to monitor the superconducting coil module in real time, obtain a voltage of the superconducting coil module, and compare the voltage of the superconducting coil module with a preset threshold voltage for quench protection to determine whether the superconducting magnet unit suffers the quench.

The present disclosure utilizes a voltage quench detection method through a resistive voltage diagnostic module, which calculates a threshold voltage for quench protection through the maximum temperature rise that can be permitted by the coil, and conducts real-time monitoring of the coil voltage, so as to realize the quench detection. This is a mature technology that allows for fast and reliable quench detection once the quench occurs.

In an embodiment, the distributed optical fiber diagnostic module is configured to perform light scattering and demodulation processing on incident light captured by the distributed sensing optical fiber through the optical fiber splitting unit to obtain Rayleigh-scattered light; and the signal processing unit is configured to determine a quench diagnosis range through comparison of the Rayleigh-scattered light with a preset optical frequency difference, and perform quench diagnosis through a quench determination algorithm in the quench detection unit according to the quench diagnosis range to determine whether a current quench diagnosis range is subjected to quench.

The present disclosure is based on a preset distributed fiber optic diagnostic module, in which after the incident light enters the optical fiber, impurities inherent in the optical fiber will cause light scattering, and demodulation processing is performed on the backward-scattered light. In the meanwhile, the distributed fiber optic diagnostics are positioned by the difference in frequency between the Rayleigh-scattered light generated at various positions in the optical fiber and a local reference light. Then, by means of a predetermined quench algorithm in the quench detection unit, the quench diagnosis is carried out on the quench diagnosis range to determine whether the quench occurs in the current quench diagnosis range, thereby realizing a local accurate localization of the superconducting magnet when a quench occurs, and realizing the distributed measurement of the quench spatial continuity for early warning of the quench.

In an embodiment, the voiceprint diagnostic module is configured to receive a voiceprint signal generated by the superconducting magnet system through the optical fiber listener, emit a light signal according to the voiceprint signal, receive a reflected light signal of the light signal after Rayleigh reflection, reduce the reflected light signal to a first acoustic signal, perform a weighted dimension-reduced optimization on the first acoustic signal using a preset Mel-frequency cepstral Coefficient (MFCC) feature vector to obtain a second acoustic signal, and identify the second acoustic signal through a preset vector quantization algorithm in the quench determination unit to determine whether the quench occurs in the superconducting magnet system.

The present disclosure achieves the early warning and positioning of quench and assists in the quench judgment through the analysis of optical signals for the transmission process of optical signals and the preset vector quantization algorithm. In the meanwhile, based on the resistant to insulation and anti-electromagnetic interference of the fiber-optic acoustic sensor, the acoustic fiber can be installed directly on the surface of the superconductor for the quench detection without damage the insulation of the superconductor, while the optical signal is not affected by electromagnetic interference, which is stable and reliable.

In an embodiment, the vector quantization algorithm is configured to be trained through steps of:

selecting a voiceprint training set;

performing signal processing on the voiceprint training set to obtain an acoustic signal;

processing the acoustic signal through the voiceprint analyzer to obtain an optimized dimensionally-reduced MFCC-based feature vector, a variance contribution rate, and a cumulative variance contribution rate; and training the vector quantization algorithm based on the optimized dimensionally-reduced MFCC-based feature vector, the variance contribution rate and the cumulative variance contribution rate.

The present disclosure trains the vector quantization algorithm to improve the recognition accuracy, so as to improve the accuracy and reliability of the quench diagnosis.

BRIEF DESCRIPTION OF THE DRAWINGS

FIG. 2 is a flow chart of a quench detection method based on the superconducting magnet system according to an embodiment of the present disclosure.

DETAILED DESCRIPTION OF EMBODIMENTS

The technical solutions in the embodiments of the present disclosure will be clearly and completely described below with reference to the accompanying drawings in the embodiments of the present disclosure. It is clear that described below are only some embodiments of the present disclosure, instead of all embodiments of the disclosure. Based on the embodiments in the present disclosure, all other embodiments obtained by one of ordinary skill in the art without making creative effort shall fall within the scope of the present disclosure.

Embodiment 1

Figure 1:
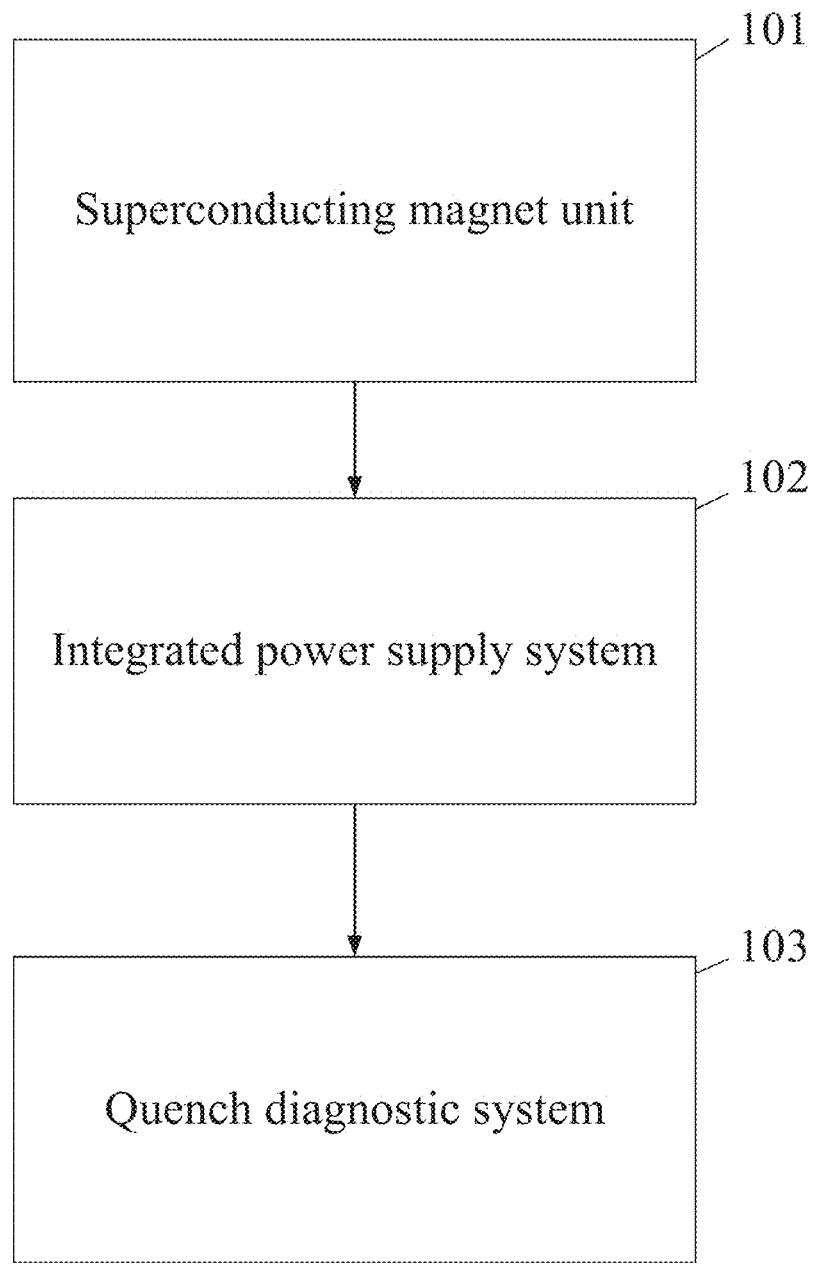
FIG. 1 is a schematic diagram of a superconducting magnet system for fusion reactors according to an embodiment of the present disclosure.

This embodiment provides a superconducting magnet system for fusion reactors (as shown in FIG. 1), which includes a superconducting magnet unit 101, an integrated power supply system 102 and a quench diagnostic system 103.

In this embodiment, the superconducting magnet unit 101 includes a superconducting coil module and a cryogenic refrigeration module. The superconducting coil module includes a toroidal field coil, a poloidal field coil and a centric solenoidal magnet module.

The integrated power supply system 102 includes a power supply module, a power supply monitoring module, and an alternating current (AC)/direct current (DC) power distribution module connected to the power supply module and the power supply monitoring module. The power supply monitoring module is connected to the quench diagnostic system. The AC/DC power distribution module includes a DC power supply unit and an AC power supply unit.

The quench diagnostic system 103 includes a resistive voltage diagnostic module, a distributed optical fiber diagnostic module and a voiceprint diagnostic module. The distributed optical fiber diagnostic module includes a distributed sensing optical fiber, an optical fiber splitting unit, a signal processing unit and a quench detection unit. The voiceprint diagnostic module includes an optical signal processing unit, a voiceprint processing unit and a quench determination unit.

Figure 3:
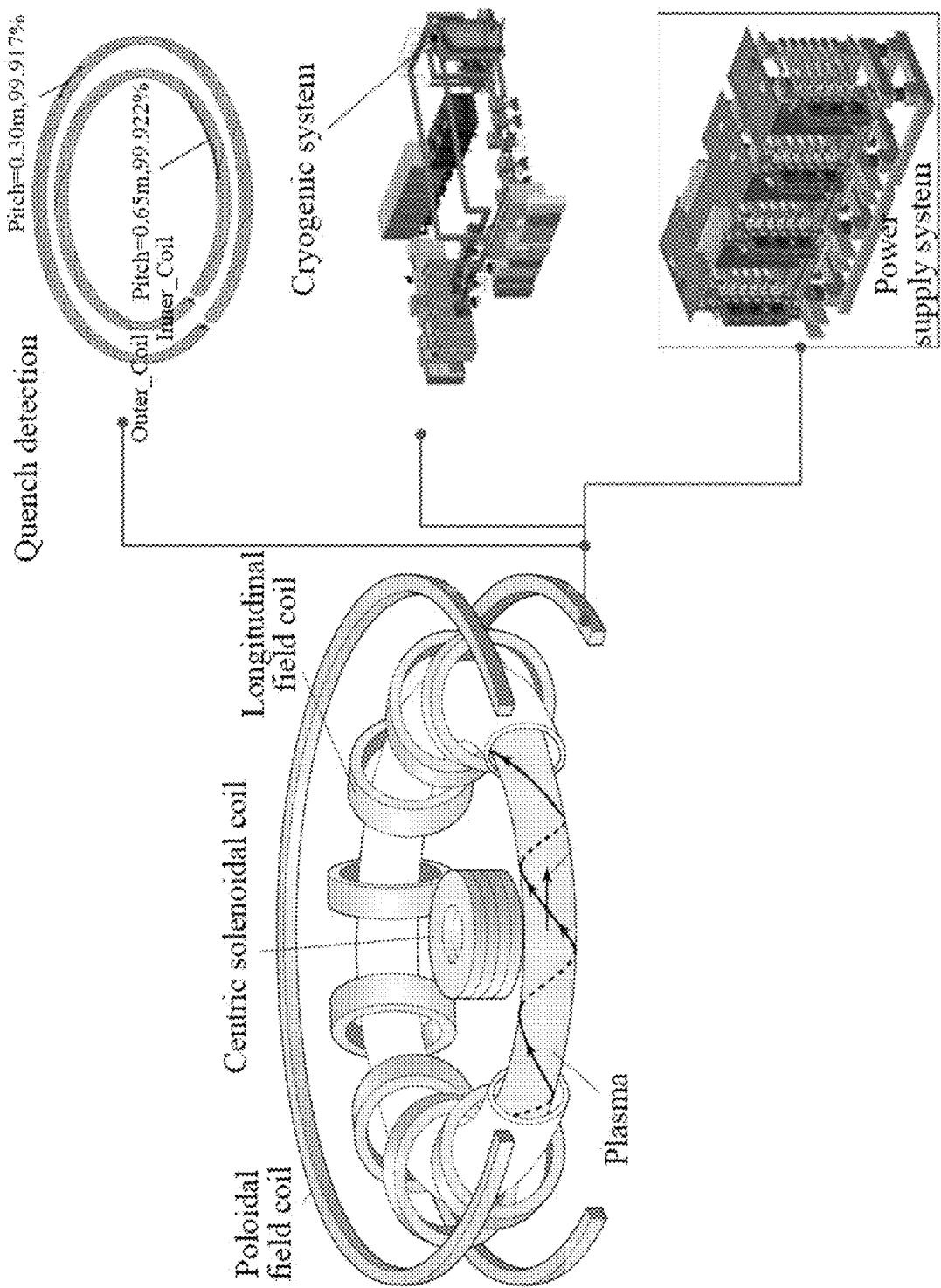
FIG. 3 is a schematic diagram of another superconducting magnet system according to an embodiment of the present disclosure.

In this embodiment, with reference to FIG. 3, a schematic diagram of a structure of a superconducting magnet system for a fusion reactor is provided, which includes a plasma. The poloidal field coil, a centric solenoidal coil and a longitudinal field coil constitute the superconducting coil module. The poloidal field coil is connected with a quench detection system (i.e., the quench diagnostic system), a cryogenics system (i.e., the cryogenic refrigeration module) and a power supply system to form the integrated power supply system.

In this embodiment, the superconducting magnet unit 101 is made of an ultra-low temperature high-strength structural material and a high temperature superconducting material.

In this embodiment, the structural material of the superconducting magnet system is an ultra-low-temperature and high-strength structural material, such as N50. The superconducting coil module of the superconducting magnet system is made of a high-temperature superconducting material, such as Bi2212, ReBCO, $MgB_2$, etc.

In this embodiment, the superconducting coil module adopts a graded hybrid winding, where windings or coils are graded according to a magnetic field distribution of a magnet winding, and the windings or coils in different grades are made of different superconducting materials.

In this embodiment, the superconducting coil module adopts graded hybrid windings or hybrid magnets, that is, windings or coils are graded according to a magnetic field distribution of a magnet winding; and the windings or coils in different grades are made of different superconducting materials. Generally, the NbTi and $MgB_2$ superconducting materials are suitable for a magnetic field strength of 0-6 T; the $Nb_3Sn$ superconducting material is suitable for a magnetic field strength of 6-12 T; the $Nb_3Sn$ superconducting material with a high current density is suitable for is suitable for a magnetic field strength of 12-16 T; and a high temperature superconducting material, such as Bi2212 and ReBCO, is suitable for a magnetic field strength of more than 16 T. Different layers of windings/subcoils are assembled in kit mode, and the windings/subcoils are connected through superconducting joints.

In this embodiment, the AC/DC power distribution module is formed by the DC power supply unit and the AC power supply unit connected in series, where an AC side of the AC/DC power distribution module is configured to adopt a multi-pulse AC phase shifting mode, and a DC side of the AC/DC power distribution module is provided with a pulse wave power supply.

In this embodiment, the AC/DC power distribution module is formed by the DC power supply unit and the AC power supply unit connected in series, where a multi-pulse wave AC phase shifting mode is adopted on an AC side, and a 6*N pulse wave power supply is constructed on a DC side (N refers to the number of the modules connected in parallel), which can reduce DC output voltage ripple and current ripple. At the same time, the power supply module consists of a plurality of DC power supply modules connected in parallel. Each DC power supply module reduces the design capacity, and the DC power supply modules are connected in parallel through an appropriate amount of power devices to output the working current required by the magnet, where the redundant capacity configuration of the power supply is N+1, i.e., N normal power supplies satisfy the operation index, and one for on-line standby. When there is a failure of a certain power supply, the faulty module is withdrawn, and the current is borne by the running power supply modules, improving the redundancy.

In this embodiment, the DC power supply unit includes four converter units, i.e., CU1, CU2, CU3 and CU4. Each of the four CUs is configured to adopt a modularized design with an independent control system and a bypass switch, and the four CUs form four independent DC power supply modules.

In this embodiment, the DC power supply module is configured to cut off a positive and negative isolation switch when detecting that a current of a loop drops to zero.

In this embodiment, the four power supply modules are working at the same time, once one of the modules fails, it is only necessary to withdraw the faulty module from operation, and when the current in the unit circuit of the faulty module drops to zero, the positive and negative isolation switches are cut off. In this case, the fault is completely removed from the system. In this way, the load current is used as the feedback for all modules, and when one module exits due to failures, the other three modules are still fed with the load current, thus ensuring the stability of the load current.

In this embodiment, the resistive voltage diagnostic module is configured to monitor the superconducting coil module in real time, obtain a voltage of the superconducting coil module, and compare the voltage of the superconducting coil module with a preset threshold voltage for quench protection to determine whether the superconducting magnet unit suffers the quench.

In this embodiment, a voltage quench detection method is used through a resistive voltage diagnostic module, which calculates a threshold voltage for quench protection through the maximum temperature rise that can be permitted by the coil, and conducts real-time monitoring of the coil voltage, so as to realize the quench detection. This allows for fast and reliable quench detection once the quench occurs.

In this embodiment, the distributed optical fiber diagnostic module is configured to perform light scattering and demodulation processing on incident light captured by the distributed sensing optical fiber through the optical fiber splitting unit to obtain Rayleigh-scattered light. The signal processing unit is configured to determine a quench diagnosis range through comparison of the Rayleigh-scattered light with a preset optical frequency difference, and perform quench diagnosis through a quench determination algorithm in the quench detection unit according to the quench diagnosis range to determine whether a current quench diagnosis range is subjected to quench.

In this embodiment, the distributed optical fiber diagnostic module scatters incident light by means of an optical fiber wound on the superconducting magnet system, followed by demodulation processing of the backward-scattered light obtained after scattering. The optical frequency-domain reflectometry (OFDR)-based distributed optical fiber diagnosis is used for positioning by means of the frequency difference between the Rayleigh-scattered light generated at various places of the optical fiber and the local reference light. In view of the sensing mechanism, the OFDR obtains the temperature and strain of the optical fiber by measuring the frequency shift of the Rayleigh-scattered light, and locates the quench region according to the temperature and the strain through a preset quench discrimination algorithm. In this embodiment, firstly, an appropriate spatial resolution $\Delta x$ ($\leq 5$ mm) and temporal resolution $\Delta t$ ($\geq 10$ Hz) are selected, and then normal regions are located. Locations of hot spots are marked by scanning the temperature rise. An algorithm execution region is locked, and at the same time whether the algorithm execution region is subjected to quench is determined according to the quench logic. When the boundary size and the boundary temperature thresholds are both satisfied at the same time, it is determined to be a quench event, or else a recoverable quench event, and the protection threshold of the hot spot temperature is increased in the quench discrimination algorithm. In this embodiment, the localization of the boundary of the normal region can be performed with the thermocouple temperature corresponding to the voltage quench threshold value as the minimum propagation region boundary temperature (Tmpz) of the region, and the spectral shift of the position corresponding to the voltage quench threshold as the propagation boundary of the normal region.

In this embodiment, the voiceprint diagnostic module is configured to receive a voiceprint signal generated by the superconducting magnet system through the optical fiber listener, emit a light signal according to the voiceprint signal, receive a reflected light signal of the light signal after Rayleigh reflection, reduce the reflected light signal to a first acoustic signal, perform a weighted dimensionality reduction optimization on the first acoustic signal using a preset Mel-frequency cepstral Coefficient (MFCC) feature vector to obtain a second acoustic signal, and identify the second acoustic signal through a preset vector quantization algorithm in the quench determination unit to determine whether the quench occurs in the superconducting magnet system.

In this embodiment, the voiceprint diagnostic module transmits the light signal with a certain frequency through the light transmitting unit. The light signal encounters the sound wave generated by the superconducting magnet during the traveling within the optical fiber wire wrapped around the superconducting magnet. The light signal is partially reflected back to the optical fiber listener after Rayleigh reflection, and processed by the light receiving unit and the amplifying unit to obtain a reflected light signal. The reflected light signal is restored into an acoustic signal through the demodulation unit, which is then transmitted to the voiceprint analysis server through the communication unit and the length information. The acoustic signal is subjected to weighted dimensionality reduction optimization by the voiceprint analysis server based on MFCC feature vectors. The voiceprint analysis server ultimately determines whether the quench occurs by identifying the optimized acoustic signal using a vector quantization algorithm.

In an embodiment, the vector quantization algorithm is configured to be trained through steps of: selection of a voiceprint training set, a signal processing on the voiceprint training set to obtain an acoustic signal, a processing on the acoustic signal through the voiceprint analyzer to obtain an optimized dimensionally-reduced MFCC-based feature vector, a variance contribution rate, and a cumulative variance contribution rate, and a training process on the vector quantization algorithm based on the optimized dimensionally-reduced MFCC-based feature vector, the variance contribution rate and the cumulative variance contribution rate.

In this embodiment, the vector quantization algorithm is obtained by neural network training, and the training process includes the following steps. A voiceprint training set is selected. The voiceprint training set is subjected to dimensionally-reduced optimization to obtain the optimized dimensionally-reduced MFCC-based feature vector, the variance contribution rate and the cumulative variance contribution rate. The voiceprint training set is calibrated. The optimized dimensionally-reduced MFCC-based feature vector of the training set $(v, v_1, \ldots, v_h)$, the variance contribution rate and the cumulative variance contribution rate of the training set are taken as inputs, and the corresponding quench results are taken as outputs, to train the machine learning model, so as to obtain the trained vector quantization algorithm. The optimized dimensionality-reduced target MFCC-based feature vector, the variance contribution rate and the cumulative variance contribution rate obtained from the target signal by the voiceprint analysis server are input into the vector quantization algorithm to obtain the quench determination results.

Embodiment 2

This application also provides a quench determination method based on the fusion reactor superconducting magnet system, referring to FIG. 2, which mainly includes steps (S201)-(S205).

(S201) An optical signal is transmitted to the distributed optical fiber preset on the superconducting magnet unit to obtain Rayleigh-scattered light reflected from different regions of a distributed optical fiber.

In this embodiment, step (S201) specifically includes the following steps. An optical signal is transmitted to the distributed optical fiber through a optical fiber listener connected to the distributed optical fiber. Scattering is performed on the optical signal according to the distributed optical fiber to obtain backward scattered light.

The backward scattered light is mediated to obtain Rayleigh-scattered light generated in different regions of the distributed optical fiber.

(S202) The Rayleigh-scattered light is processed through a preset acoustic and optical mediation method to obtain a voiceprint signal corresponding to the Rayleigh-scattered light.

In this embodiment, step (S202) specifically includes the following steps. The Rayleigh-scattered light is received by the optical fiber listener, and amplified and mediated to obtain a first voiceprint signal corresponding to the Rayleigh-scattered light. A weighted dimension-reduced process is performed on the first voiceprint signal through a pre-determined MFCC feature vector to obtain a voiceprint signal.

(S203) The voiceprint signal is identified using a predetermined vector quantization algorithm according to the voiceprint signal to determine whether the superconducting magnet suffers a quench.

In this embodiment, step (S203) specifically includes the following steps. A similarity between the voiceprint signal and a predetermined standard voiceprint signal is calculated by the predetermined vector quantization algorithm to determine whether the superconducting magnet suffers a quench. If the similarity is greater than or equal to a predetermined similarity threshold, then the superconducting magnet has not experienced a quench. If the similarity is less than the predetermined similarity threshold, then the superconducting magnet suffers a quench.

(S204) If the superconducting magnet undergoes a quench, the temperatures and spectral shifts of different regions of the distributed optical fiber are obtained through a predetermined spectral analysis method based on the Rayleigh-scattered light reflected from the different regions of the distributed optical fiber.

In this embodiment, the step (S204) specifically includes the following steps. The frequency differences between the Rayleigh-scattered light reflected from the different regions and a pre-determined standard light are calculated to obtain spectral shifts at different region of the acoustic fiber, and the temperature values of the different regions of the acoustic fiber are obtained based on the spectral shifts.

(S205) The temperature and spectral shift are respectively compared with a predetermined temperature threshold and a spectral shift threshold to obtain a quench region of the superconducting magnet unit.

In this embodiment, before performing the step (S205), a quench voltage threshold of the superconducting magnet is obtained by calculating a maximum temperature rise of a coil wound on the superconducting magnet. The voltage of the superconducting magnet is detected in real time and compared with the quench voltage threshold to determine whether a quench occurs in the superconducting magnet. If the voltage is greater than the quench voltage threshold and lasts a certain period of time, then the superconducting magnet is determined to suffer a quench, and the current of the superconducting magnet is diverted. If the voltage is less than or equal to the quench voltage threshold, then the superconducting magnet is determined to not suffer a quench.

In this embodiment, the step (S205) specifically includes the following steps. A temperature threshold value and a spectral shift threshold value corresponding to the quench threshold voltage are obtained. Whether the quench occurs in the different regions is determined by comparing the magnitude of the temperature values and spectral shifts of the different regions with the temperature threshold value and the spectral shift threshold value. If there exists a region with a temperature value greater than or equal to the temperature threshold value, and a spectral shift greater than or equal to the spectral shift threshold, then a complete quench occurs in the region. If there exists a region with a temperature value greater than or equal to the temperature threshold, or a spectral shift greater than or equal to the spectral shift threshold, then a recoverable quench occurs in the region, and the quench is recovered by cutting off the current in the region.

The present disclosure provides a superconducting magnet system for a fusion reactor and a quench detection method applied to the fusion reactor superconducting magnet system. The fusion reactor superconducting magnet system includes a superconducting magnet unit, an integrated power supply system and a quench diagnostic system. The superconducting magnet unit includes a superconducting coil module and a cryogenic refrigeration module. The superconducting coil module includes a toroidal field coil, a poloidal field coil and a centric solenoidal magnet module. The superconducting coil is configured to generate a toroidal magnetic field to confine the plasma and control the bit type of the plasma to facilitate breakdown of the plasma and to maintain a plasma current for energy formation. The integrated power supply system includes a power supply module, a power supply monitoring module, and an AC/DC power distribution module. The AC/DC power distribution module includes a DC power supply unit and an AC power supply unit, improving reliability of power supply. The quench diagnostic system includes the traditional resistance and voltage quench detection method, and monitor the superconducting magnet system voltage in real time, so as to realize the quench detection. This technology is mature, and once the quench appears, it can be detected quickly and reliably. At the same time, the distributed fiber optic diagnostic module and the voiceprint diagnostic module are provided for monitoring local hot spot events, so as to achieve the auxiliary detection of weak points of the high-temperature superconducting magnet. Moreover, in combination with the monitoring data of the relevant thermal parameters, the quench warning and risk assessment are enabled, facilitating the accurate location of the quench site in the superconducting magnet when suffering the quench.

The above-described embodiments provide a further detailed description of the objects, technical solutions and beneficial effects of the present disclosure. It should be understood that the above embodiments are merely illustrative of the present disclosure, and are not intended to limit the scope of the present disclosure. It should be noted that for one of ordinary skill in the art, any modifications, equivalent replacements and improvements made within the spirit and principles of the present disclosure shall be included in the scope of the present disclosure defined by the appended claims.

What is claimed is:

1. A nuclear fusion reactor superconducting magnet system, comprising:
 a superconducting magnet unit;
 an integrated power supply system; and
 a quench diagnostic system;
 wherein the superconducting magnet unit comprises a superconducting coil module and a cryogenic refrigeration module;
 the superconducting coil module comprises a toroidal field coil, a poloidal field coil and a centric solenoidal magnet module;
 the superconducting coil module comprises a graded hybrid winding,
  wherein windings or coils of the superconducting coil module are graded according to a magnetic field distribution of the windings; and
  wherein the windings or coils in different grades are made of different superconducting materials,
  wherein a winding or coil among the windings or coils with a magnetic field strength exceeding 16 T is made of a high-temperature superconducting material;
 the integrated power supply system comprises a power supply module, a power supply monitoring module, and an alternating current (AC)/direct current (DC) power distribution module connected to the power supply module and the power supply monitoring module;
 the power supply monitoring module is connected to the quench diagnostic system;
 the AC/DC power distribution module comprises a DC power supply unit and an AC power supply unit;
 the power supply module comprises a plurality of first DC power modules connected in parallel through a power device, and is configured to output a working current required by the windings; and
 the AC/DC power distribution module is formed by the DC power supply unit and the AC power supply unit connected in series, wherein
  an AC side of the AC/DC power distribution module is configured to adopt a multi-pulse AC phase shifting mode, and
  a DC side of the AC/DC power distribution module is provided with a pulse power supply comprising a plurality of power modules connected in parallel;
 the quench diagnostic system comprises a resistive voltage diagnostic module, a distributed optical fiber diagnostic module and a voiceprint diagnostic module;
 the distributed optical fiber diagnostic module comprises a distributed sensing optical fiber, an optical fiber splitting unit, a signal processing unit and a quench detection unit;
 the voiceprint diagnostic module comprises a fiber-optic acoustic sensor, an optical fiber listener, a light reflection unit, a voiceprint processing unit and a quench determination unit;
  the distributed sensing optical fiber is configured to capture an incident light;
  the optical fiber splitting unit is configured to perform light scattering and demodulation on the incident light to generate a Rayleigh-scattered light;
  the signal processing unit is configured to determine a quench diagnosis range through comparison of the Rayleigh-scattered light with a preset optical frequency difference;
  the quench detection unit is configured to determine whether there is a quench in a current state according to the quench diagnosis range through a preset quench determination algorithm;
  the signal processing unit is also configured to measure a frequency shift of the Rayleigh-scattered light to obtain a temperature and a strain of the distributed sensing optical fiber;
  the quench detection unit is also configured to locate a quench zone using the quench determination algorithm according to the temperature and the strain of the distributed sensing optical fiber;
  the quench determination algorithm is configured to be executed to perform:
   selecting an appropriate spatial resolution and an appropriate temporal resolution to locate a normal zone,
   marking a location of a hot spot and determining an algorithm execution zone by scanning heating, and
   determining whether there is a quench in the algorithm execution zone according to a quench logic; and
 the optical fiber listener is configured to receive a voiceprint signal generated by the superconducting magnet system, and emit a light signal according to the voiceprint signal;
 the light reflection unit is configured to perform Rayleigh reflection on the light signal to generate a reflected light signal;

the optical fiber listener is also configured to receive the reflected light signal and convert the reflected light signal into a first acoustic signal;

the voiceprint processing unit is provided with a voiceprint analyzer, and the voiceprint analyzer is configured to perform weighted dimensionality-reducing optimization on the first acoustic signal using a preset Mel-frequency cepstral Coefficient (MFCC)-based feature vector to obtain a second acoustic signal; and the quench determination unit is configured to identify the second acoustic signal through a preset vector quantization algorithm to determine whether the superconducting magnet unit suffers a quench.

2. The superconducting magnet system of claim 1, wherein the superconducting magnet unit is made of a structural material and a superconducting material.

3. The superconducting magnet system of claim 1, wherein the DC power supply unit comprises four converter units (CUs); each of the four CUs is configured to adopt a modularized design with an independent control system and a bypass switch; and the four CUs are configured to form four independent second DC power modules.

4. The superconducting magnet system of claim 3, wherein the four second DC power modules are configured to disconnect a positive-negative isolation switch when detecting that a loop current drops to zero.

5. The superconducting magnet system of claim 1, wherein the resistive voltage diagnostic module is configured to monitor the superconducting coil module in real time, obtain a voltage of the superconducting coil module, and compare the voltage of the superconducting coil module with a preset threshold voltage for quench protection to determine whether the superconducting magnet unit suffers the quench.

6. The superconducting magnet system of claim 1, wherein the vector quantization algorithm is configured to be trained through steps of:

selecting a voiceprint training set;

performing signal processing on the voiceprint training set to obtain an acoustic signal;

processing the acoustic signal through the voiceprint analyzer to obtain an optimized dimensionally-reduced MFCC-based feature vector, a variance contribution rate, and a cumulative variance contribution rate; and training the vector quantization algorithm based on the optimized dimensionally-reduced MFCC-based feature vector, the variance contribution rate and the cumulative variance contribution rate.

* * * * *